United States Patent [19]

Prudhon et al.

[11] 4,086,099

[45] Apr. 25, 1978

[54] METHOD OF PREPARING PLASTER

[75] Inventors: François Prudhon, Saint-Auban; Jean Fantino, Condrieu; François Mounier, Champagne Au Mont D'Or, all of France

[73] Assignee: Rhone-Poulenc Industries, Paris, France

[21] Appl. No.: 591,333

[22] Filed: Jun. 30, 1975

[30] Foreign Application Priority Data

Jun. 28, 1974  France .............................. 74 22621

[51] Int. Cl.² ............................................ C04B 11/00
[52] U.S. Cl. ..................................... 106/109; 106/110; 423/171; 423/172; 423/554; 423/555; 432/14; 432/15; 34/57 E
[58] Field of Search ................ 106/109, 110; 423/554, 423/555, 171, 172; 432/14, 15; 34/57 E

[56] References Cited

U.S. PATENT DOCUMENTS

| | | | |
|---|---|---|---|
| 1,183,098 | 5/1916 | Merrell et al. ................ | 261/79 A X |
| 3,050,374 | 8/1962 | Burt et al. ............................ | 159/4 B |
| 3,238,021 | 3/1966 | Webber et al. ................ | 261/79 A X |
| 3,563,701 | 2/1971 | Cannon ................................ | 423/555 |
| 3,648,994 | 3/1972 | Remmers et al. .................... | 106/109 |
| 3,805,869 | 4/1974 | Winter et al. ........................ | 159/4 B |
| 3,862,907 | 1/1975 | Shimotsuma et al. ........ | 269/79 A X |

*Primary Examiner*—Patrick P. Garvin
*Assistant Examiner*—John P. Sheehan
*Attorney, Agent, or Firm*—McDougall, Hersh & Scott

[57] ABSTRACT

A method of preparing plaster by brief contact between gypsum and a hot gas. The method comprises introducing the gypsum through the axial tube of a nozzle, around which a helical stream of hot gases is created, and bringing the two phases into contact in a vessel at the outlet of the nozzle. The method of the invention makes it possible to vary the quality of plaster produced and to use either dry gypsum or dilute gypsum pastes as the starting material.

9 Claims, 1 Drawing Figure

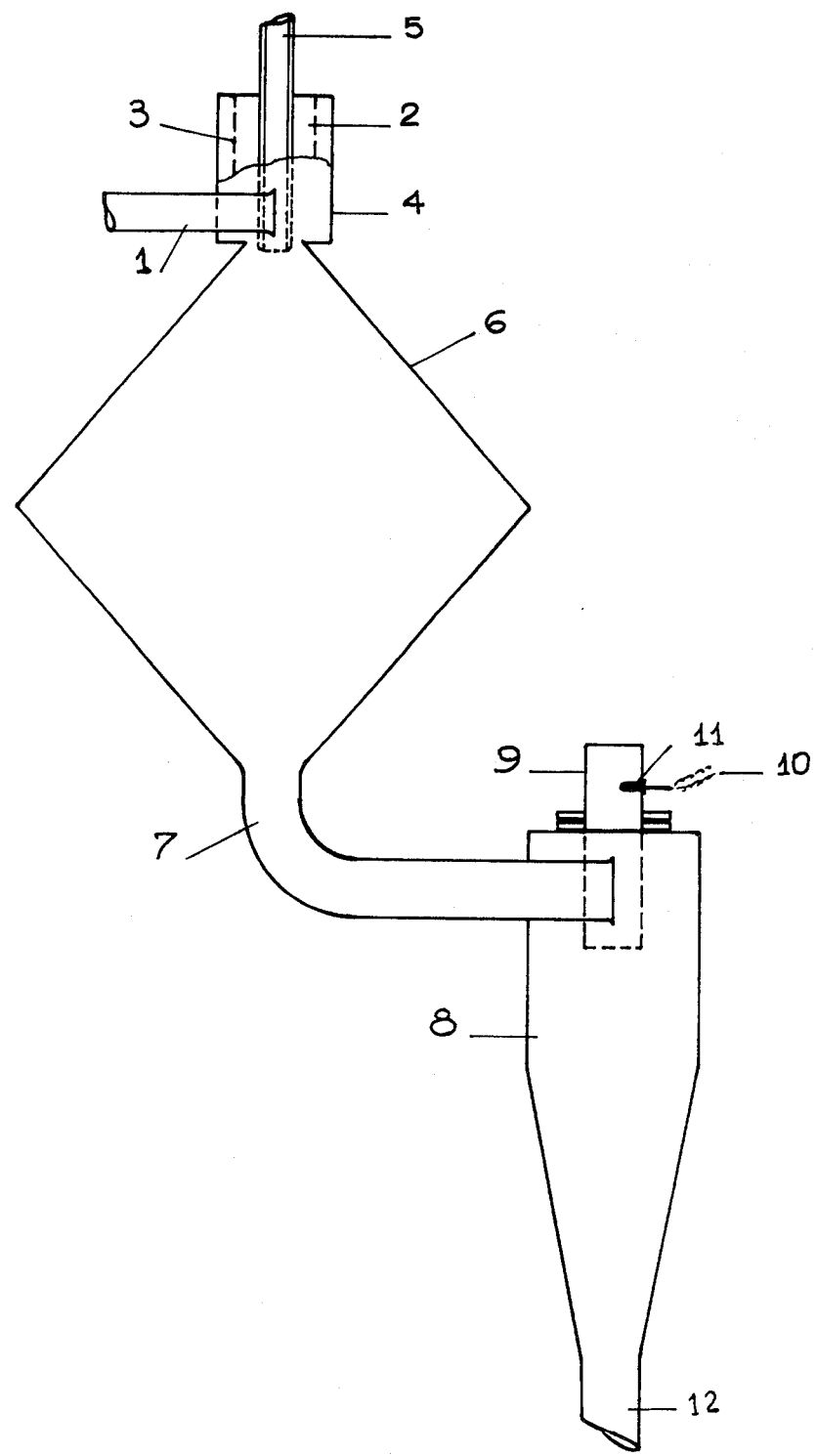

METHOD OF PREPARING PLASTER

The invention relates to a method of preparing plaster from dihydrated sulphate of calcium. It applies more particularly to the treatment of gypsum obtained from the preparation of phosphoric acid by the wet process.

Dihydrated sulphate of calcium, often known as "phosphogypsum", is obtained from works where phosphoric acid is prepared by the action of sulphur on calcium phosphate ores. For a long time, people have been trying to recover phosphogypsum in the form of plaster. Industrial installations for carrying out the necessary dehydration usually consist of a furnace, often a rotary one. They produce a mixture containing sulphate of calcium $SO_4Ca$, $\frac{1}{2} H_2O$ known as "semihydrate" and ($SO_4Ca$) anhydrite III which is easily rehydrated, and in addition the anhydrite II variety described as "overburnt", and gypsum. When there are appreciable quantities of anhydrite II and gypsum, the plasters do not have the properties required by consumers. Plaster obtained in this way takes too long to set and/or has unsatisfactory mechanical properties. The investment required to set up such installations is an additional drawback.

Various other processes have been proposed for some years, in which phosphogypsum undergoes rapid partial dehydration. This may be done, e.g., in a fluidized bed, in a pneumatic conveyor or in cyclones. The disadvantages of fluidized beds are known, particularly with regard to the conditions for feeding with either solids or gases. These various methods use calorie-vector gases, at relatively low temperatures, to reduce the formation of over-burnt anhydrite and corrosion of the apparatus; this entails the use of a large amount of gas and the need for recycling, while the expanse of high pressure machines is added to the cost of the rest of the installation without necessarily always preventing the formation of heterogeneous products.

The invention avoids these drawbacks and uses a particularly simple apparatus in a method which is remarkable for its flexibility.

The method of the invention for preparing plaster by dehydrating gypsum comprises bringing a gas into intimate contact with the gypsum, and any water accompanying it, in a vessel, the gas being at a temperature of 1,000 to 150° C, preferably from 900° to 165° C, carrying sufficient calories for the required dehydration; the gypsum being let into the vessel in a straight stream guided by an axial tube, around which a helical stream of hot gases is formed, the helical stream being symmetrical relative to the axis of the tube and having at least 40 times more movement than the straight stream in the section which they cross on entering the vessel provided to bring them into contact; and then comprises recovering the plaster by a known means.

A particularly satisfactory way of bringing the various substances into intimate contact with one another is to apply the method in the apparatus, hereinafter referred to as a "nozzle," described in copending application Ser. No. 479,774, filed June 17, 1974, and entitled "Process for Contacting Substances Which Occur in Different Phases."

The substances are brought into contact in a vessel which is preferably arranged at the outlet from the nozzle described in the above application. It is necessary to prevent either a large or small proportion of the substances introduced from being projected against the walls of the vessel before they have made sufficient contact with one another. If this is to be done, under optimum conditions, the apparatus used should have the features mentioned in the prior application and in particular should comprise an outlet aperture which is restricted towards the vessel for bringing the substances into contact; the downstream aperture of the axial tube should be near the outlet aperture. The helical movement is brought about by introducing the gases through a plurality of pipes at a tangent to the cylindrical casing surrounding the tube and symmetrical relative to the tube; alternatively the gases may be introduced through a single tangential pipe discharging into an annular space surrounding a perforated internal cylinder coaxial with the external casing and the axial tube. Similar arrangements could be used, though none has been found comparable with the apparatus mentioned in providing very satisfactory results when carrying out the method of the invention; they yield a heterogeneous final product and have deposits on the walls.

The gypsum, possibly accompanied by free water, is thus brought into contact with the hot gases at the outlet from a nozzle, preferably such as that described above, in a vessel communicating with it. The vessel is also described in the above-mentioned application. It may thus be cylindroconical, in which case the nozzle is on the upper part of the cylindrical surface, or biconical, in which case the two cones should have a common base and one and the same axis or two axes intersecting in the plane of the base. The diameter of the base of the cones or cylinder is from 0.5 to 4 m for gas streams of 50 to 5,000 m³/h, and the angles at the apex of the cones are from 45 to 120°. A pipe is fixed to the lower apex of the cone or of one of the cones. It conveys the product formed to an arrangement, such as a cyclone, from the outlet of which one can collect the plaster formed. Other arrangements, e.g., other cyclones, and a knob for atomizing water may be provided downstream to stop the residual dust. The apparatus will be described in greater detail below with reference to the accompanying drawing. The whole apparatus is preferably made of stainless steel or any other metal which will not be oxidized under the conditions of use.

The hot gases come from a generator which preferably has low thermal inertia and which, like the method of the invention, lends itself to variable operating conditions and to rapid stopping and starting. A generator of this type is described in the patent application filed concurrently herewith and entitled "A Method and Apparatus for Carrying Out a Reaction Between Streams of Fluid."

These hot gases make up the helical stream and form a core at relatively low pressure at the outlet from the nozzle; this helps the gypsum to be fed through the axial tube which discharges along the axis of the core. The gypsum may be introduced in many different forms, an important advantage of the method as compared with previous techniques. It may be in suspension in a more or less concentrated paste, in moist fragments recovered from a filter or dry and coarsely crushed. It is passed in regular quantities into a receptacle or funnel under load relative to the nozzle. The axial tube of the nozzle is chosen with a diameter which will allow the gypsum to flow out regularly without obstruction and without leaving a large section empty.

The amount of heat required to dehydrate the gypsum and evaporate the water is calculated in known manner, particularly in the knowledge that the average specific heat for volumes measured under normal conditions (N) of temperature and pressure is 0.31 Kcal/Mm$^3$ for air, 0.33 Kcal/Nm$^3$ for fumes from light hydrocarbons (which have the advantage of not soiling the product) and 0.25 Kcal/Kg for the gypsum. The heat required to convert gypsum into serihydrate is 160 Kcal/Kg of gypsum and that required to convert gypsum into anhydrite is 220 Kcal/kg of gypsum.

The thermal data for water is well known (its enthalpy at 170° C is 660 Kcal/Kg. In the course of many tests carried out with apparatus of different sizes, heat losses in applying the method of the invention have been found to be less than 5%. For obvious reasons air is the preferred diluting and combustion-supporting gas.

As an indication, 1.3 kg of hot gases at 1,000° C is sufficient to obtain 1 kg of plaster from dry gypsum, 2 kg of the gaseous mixture at 850° C can dehydrate a paste with 30% of total water and 5.3 kg at 800° C can eliminate the excess water from a paste containing 55% of total water to give the same amount of plaster. As a comparison, 10 kg of air at 400° C were required in a pneumatic conveyor to obtain this last result.

The upper temperature limit is imposed by the behavior of the conventional materials (stainless steel or refractory steel) at that temperature. Protection by a cooled double jacket may enable still higher temperatures to be used, thereby improving the heat yield.

The minimum temperature corresponds to the theoretical extreme case where there is a minute quantity of gypsum.

The pressure required to introduce the hot gases is also relatively low, that is to say, on the whole below 1.6 bar absolute; the pressure could possibly also be used to convey the final produce pneumatically.

The temperature inside the vessels, where the gypsum, possibly with water, comes into contact with the hot gases makes it possible to adjust the composition of the final product obtained.

It is convenient to measure the temperature of the gases at the outlet from the device for separating solids and gases. This corresponds substantially to the minimum temperature in the space where the hot gases and plaster are in contact, and determines the quality of the product collected.

Semihydrate has been observed to form preferentially at an elevated temperature at this level, from 160° to 190°, and anhydrite III at a temperature between 200° and 450° C. For temperatures above 220° and below 450° C substantially pure anhydrite III is obtained (over 95% by weight). Above this last temperature, a large amount of over-burnt material forms. On the other hand it is possible to dry the gypsum, which can be dehydrated subsequently with a minimum flow of air and reduced production of steam, the free water being previously eliminated between 80° and 150° C in an apparatus as described above.

The composition of the plaster is given below as an indication, as a function of the outlet temperature of the gases measured in the manner indicated above.

TABLE I

| Outlet temperature ° C | Gypsum % weight | Semi-hydrate % weight | Anhydrite III % weight |
| --- | --- | --- | --- |
| 152 | about 25 | about 75 | 0 |
| 168 – 169 | <8 | 68 – 72 | 23 – 26 |
| 171 – 172 | <5 | 52 – 54 | 42 – 43 |
| 175 | <5 | 31 | 62 |

TABLE I-continued

| Outlet temperature ° C | Gypsum % weight | Semi-hydrate % weight | Anhydrite III % weight |
| --- | --- | --- | --- |
| 210 | <5 | <5 | about 95 |

No trace of anhydrite II was detected in these various tests.

These estimates of the different varieties of sulphate of calcium are not very accurate and may include a relative error of ± 10%.

Various tests carried out with phosphogypsum obtained by action on various ores (Morocco and Togoland for example) give results which agree with these findings.

The dwell time at a temperature above the temperature which determines the quality of the plaster produced is unimportant, since the special feature of the method of the invention, which differentiates it from conventional methods, is the very intimate and homogeneous contact between the different phases for a very short period. Any water present, even at high temperature, in the zone where the first contacts take place will prevent any over-cooked material from forming. However, it is obviously necessary for the contact to take place, that is to say, the dwell time must be over about 1/10 second. In practice it is not necessary for the dwell time to be more than 10 seconds.

The method of the invention will be described below in greater detail, at the same time as a preferred apparatus for carrying it out, with reference to the accompanying drawing.

The drawing shows an embodiment of the apparatus which may be used for the purpose of this invention.

The hot gases, which generally include a high proportion of air mixed with the combustion products of the burnt fluid which may, e.g., be methane, are passed through the tangential pipe 1 into the chamber 2. Here they follow helical paths which are regularized and made symmetrical relative to the axis of the chamber with the aid of the perforated wall 3 co-axial with the casing 4 of the nozzle, which brings the gases into contact with the gypsum and any water which has to be eliminated. The gypsum and any water with it are let in through the axial tube 5, which discharges near the aperture connecting the nozzle to the biconical vessel 6. The respective amount of movement on the part of the hot gases and of the gypsum, as explained above, make the liquids and solids arrive along the axis of the nozzle in a central core from which they are drawn away by the eddying gases and brought into intimate contact with molecules of the various constituents of the two streams. Because of the low pressure at the axis, this contact takes place away from the walls and is intense enough for the product to have virtually completed the development before reaching them.

The resultant mixture of the various phases is then carried along the pipe 7 to the cyclone 8. From here the gases escape through the pipe 9, where the temperature which determines the quality of the product is recorded by a known means 10 inserted in a sheath 11, while the plaster is collected through the limb 12. Means (not shown) may be provided to stop the dust carried by the gases.

Except for the cyclone, the apparatus which is shown in a vertical position in the figure may be in a horizontal or oblique position.

The rapidity of dehydration makes the pieces of gypsum present burnt, and the plaster collected has a regular grain size generally from 5 to 10 microns. It may be used directly without any crushing.

To illustrate the quality of the product obtained by the method of the invention, it has been compared with products obtained from the same raw material in rotary kilns.

From the tests set out in Table II, it will be seen that a gypsum of the same morphology and impurities, subjected to conventional activation in an apparatus with a long dwell time, yields an average quality plaster, while it is converted into a high quality plaster as the result of the activity imparted to form the product by the method of this invention.

TABLE II

| Nature of plaster | Plaster obtained in invention | | Plaster obtained in a rotary kiln | |
|---|---|---|---|---|
| | Large content of S. —H. | Large content of A.III | Large content of S. —H | Large content of A,III |
| T° Discharge | 168–169° | 175° | (155–165°) | (165–175°) |
| Beginning of setting | 2 to 3′ | 1′30 to 2′30 | 3 to 4′ | 2 to 3′ |
| End of setting | 8 to 11′ | 7 to 9′ | 10 to 14′ | 8 to 12′ |
| Temperature rise | 8 to 10° C | 20 to 25° C | 6 to 8° C | 10 to 15° C |
| BET area | 10–15 m2g$^{-1}$ | 15–25 m2g$^{-1}$ | 4 to 6 m2g$^{-1}$ | 5 to 7 m2g$^{-1}$ |
| $R_F$ bars | 25 to 40 | 35 to 60 | 15 to 30 | 20 to 40 |
| $R_C$ bars | 85 to 110 | 100 to 140 | 60 to 80 | 70 to 85 |

Apart from the BET area and the temperature rise, which are ascertained in known manner, these measurements are taken by the methods prescribed in AFNOR standard B.12 401.

The temperature rise is the maximum rise in the first 10 minutes after the water and plaster have been mixed in a weight ratio of 0.8/1.

Apart from the advantages already mentioned in the above description with regard to the flexibility of the process, the fact that it starts up very rapidly, the preservation of the walls, the fact that no solid is retained anywhere and many other advantages, it should be mentioned that various liquid or solid ingredients such as coloring agents, plastic additives or possibly setting retarders may be added with the gypsum and will be perfectly blended with it during the process.

Examples will now be given, purely to illustrate the method; they should not be considered as limiting the invention as defined in the claims which follow.

EXAMPLE 1

The apparatus used is similar to that shown in the accompanying drawing. The internal diameter of the chamber bounded by the perforated wall is 110 mm and the wall contains 24 holes 20 mm in diameter. The internal diameter of the casing of the nozzle is 175 mm and the tangential pipe has an average internal diameter of 85 mm; the axial tube has an internal diameter of 30 mm and arrives 39 mm downstream of the external plane of the aperture, which is 65 mm in diameter. The total internal length of the nozzle is 163 mm. The hot gases arrive in the nozzle at 550° C and at a rate of 400 kg/h. Dry gypsum (at 20° C) is inserted through the axial tube at 135 kg/h. The substances are brought into contact in the biconical vessel, which has a maximum diameter of 1 mm and angles of 90° at the top; the gases discharged from the cyclone have a temperature above 190° C. The average dwell time of the calcium sulphate at a temperature above 190° C is 6 seconds. 110 kg/h of product is collected, comprising 96% of anhydrite III with less than 4% of gypsum. No anhydrite II is detected.

The physical characteristics of the product are as follows:

| | |
|---|---|
| BET area | : 20 m2g$^{-1}$ |
| Setting time - beginning | : 1 min 30 sec. |
| end | : 4 min 30 sec. |
| Resistance to flexion $R_F$ | : 40 kg/cm2 |
| Resistance to compression $R_C$ | : 110 kg/cm2 |
| Grain size | : 10 to 8 microns |

EXAMPLE 2

3,000 m$^3$/h of air and 100 m$^3$/h of methane, measured at normal temperature and pressure, are let into a burner. After combustion the mixture of hot gases formed is passed into the nozzle described above through a tangential pipe with an average internal diameter of 27 cm which as an elliptical section at the end with axes of 40 and 12.5 cm. The internal chamber of the nozzle is bounded by a cylindrical wall which has an internal diameter of 42.5 mm and contains 216 holes 20 mm in diameter, distributed over a regular mesh of 4 × 37 cm; around the wall there is a co-axial casing with an internal diameter of 55 cm. A gypsum paste containing 55% of total water is introduced at 1,740 kg/h through the axial tube. The tube has an internal diameter of 2 cm and opens 4 cm downstream of the circular aperture of the nozzle, which is 110 mm in diameter. The vessel in which the various phases are brought into contact has a maximum diameter of 2.5 mm and a total height of 3 m. The angle at the top of the upper cone is 120° and that at the top of the lower cone 60°. A pipe with an average diameter of 25 cm is welded near the top of the lower cone and carries the product to a cyclone. The temperature measured on discharge from the cyclone is 170° C. 800 kg/h of plaster, collected from the lower outlet of the cyclone, is of approximately the following composition: 5% gypsum, 65% semi-hydrate and 30% anhydrite III. The plaster obtained is well adapted to the manufacture of top quality tiles even if a very high mixing ratio (water/plaster) is used; after drying this gives a plaster of low density with good mechanical strength.

We claim:
1. A process for preparing a plaster from gypsum comprising continuously flowing a fluid stream containing the gypsum in particulate or paste form axially through a cylindrical chamber for issuance as a linear stream therefrom into a vessel, continuously introducing a gaseous stream at elevated temperature into said chamber for continuous symmetrical flow in helical paths therethrough deflecting the helical paths of the gaseous stream into the linear stream issuing from the chamber to engage the linear stream which becomes entrained for continued travel as separated particles with the gaseous stream for removal of liquid and reaction to convert the gypsum component to plaster, and controlling the temperature of the hot gases for reaction at a temperature within the range of 160–190° C whereby a plaster is produced which is high in semi-hydrate content.

2. A process for preparing a plaster from gypsum comprising continuously flowing a fluid stream containing the gypsum in particulate or paste form axially through a cylindrical chamber for issuance as a linear stream from the chamber into a vessel, continuously introducing a gaseous stream at elevated temperature into said chamber for continuous symmetrical flow in helical paths therethrough, deflecting the helical paths of the gaseous stream into the linear stream issuing from the chamber to engage the linear stream which become entrained for continued travel as separated particles with the gaseous stream for removal of liquid and reaction to convert the gypsum component to plaster, and controlling the temperature of the hot gases at a temperature within the range of 200°–450° C whereby a plaster is produced which is high in anhydrite III.

3. A process for preparing a plaster from gypsum comprising continuously flowing a fluid stream containing the gypsum in particulate or paste form axially through a cylindrical chamber for issuance as a linear stream from the chamber into a vessel, continuously introducing a gaseous stream at elevated temperature into said chamber for continuous symmetrical flow in helical paths therethrough, deflecting the helical paths of the gaseous stream into the linear stream issuing from the chamber to engage the linear stream which become entrained for continued travel as separated particles with the gaseous stream for removal of liquid and reaction to convert the gypsum component to plaster, and controlling the temperature of the hot gases for reaction at a temperature within the range of 160°–450° C whereby a plaster is produced having a large anhydrite III and semi-hydrate content.

4. A method according to claim 3 in which the temperature of the gas is within the range of 900° to 165° C.

5. A method of preparing plaster by dehydrating gypsum according to claim 3 from an aqueous gypsum paste, characterized in that part of the water is eliminated between 80° and 150° C and the rest at a higher temperature.

6. A method according to claim 3 characterized in that the time of contact between the hot gases and the gypsum is from 1/10 second to 10 seconds.

7. A method as claimed in claim 3 in which part of the water is eliminated at a temperature within the range of 80° to 150° C with the rest at a higher temperature.

8. A method as claimed in claim 3 in which the time of contact between the hot gases and the gypsum is from 1/10 of a second to 10 seconds.

9. A method as claimed in claim 3 in which the quantity of movement of the helical stream is at least forty times greater than the quantity of movement of the linear stream at the point of contact.

* * * * *